United States Patent
Wong et al.

(10) Patent No.: US 9,420,443 B2
(45) Date of Patent: Aug. 16, 2016

(54) CLEANUP OF LAU-LESS CIRCUIT SWITCHED FALLBACK EMERGENCY CALL

(71) Applicant: NOKIA SIEMENS NETWORKS OY, Espoo (FI)

(72) Inventors: Curt Wong, Sammamish, WA (US); Devaki Chandramouli, Plano, TX (US); Laszlo Janosi, Budapest (HU); Lauri Kalevi Lahtinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 88 days.

(21) Appl. No.: 13/744,871

(22) Filed: Jan. 18, 2013

(65) Prior Publication Data

US 2014/0206305 A1    Jul. 24, 2014

(51) Int. Cl.
*H04W 4/22* (2009.01)
*H04W 36/00* (2009.01)
*H04W 76/00* (2009.01)

(52) U.S. Cl.
CPC ............ *H04W 4/22* (2013.01); *H04W 36/0022* (2013.01); *H04W 76/007* (2013.01)

(58) Field of Classification Search
CPC .. H04W 4/22; H04W 76/007; H04W 36/0022
USPC ............. 455/404.1, 417, 421, 422.1; 370/331
See application file for complete search history.

(56) References Cited

U.S. PATENT DOCUMENTS

| 2012/0069731 A1* | 3/2012 | Tooher et al. | 370/221 |
| 2012/0275401 A1* | 11/2012 | Sun | 370/329 |

FOREIGN PATENT DOCUMENTS

| WO | 2011120030 A1 | 9/2011 |
| WO | 2011156264 A2 | 12/2011 |

OTHER PUBLICATIONS

3GPP TS 24.008 V11.5.0. (Dec. 2012), Technical Specification, 3rd Generation Partnership Project; Technical Specification Group Core Network and Terminals; Mobile radio interface Layer 3 specification; Core network protocols; Stage 3 (Release 11), 678 pages.
International Search Report and Written Opinion dated Jul. 10, 2014, issued in corresponding PCT/EP2014/050901, 16 pages.

(Continued)

*Primary Examiner* — Sam Bhattacharya

(74) *Attorney, Agent, or Firm* — Squire Patton Boggs (US) LLP

(57) ABSTRACT

Communication systems may benefit from various aspects of emergency call handing. For example, wireless communication systems may benefit from clean up with respect to a fast return feature applied to an emergency call using circuit switched fallback, without a location area update. A method may include identifying an emergency communication that is a circuit switched fallback communication of a user equipment. The method may also include configuring communications so that mobile terminated services work properly after completion of the emergency communication. More particularly, for example, a method may include determining in a network element that the emergency communication is a circuit switched fallback communication. The method may also include, when the emergency call is ended, avoiding invoking a fast return feature for the user equipment.

20 Claims, 3 Drawing Sheets

(56) References Cited

OTHER PUBLICATIONS

"3rd Generation Partnership Project; Technical Specification Group Services and System Aspects; Circuit Switched (CS) fallback in Evolved Packet System (EPS); Stage 2 (Release 11)"; 3GPP Draft; 23272-B10_CRS_IMPLENTED; 3rd Genereation Partnership (3GPP); Mobile Competence Centre; 650, Route des Lucioles; F-06921 Sophia-Antipolis Cedex; France; Jun. 22, 2012, XP050625394, [retrieved on Jun. 22, 2012] sections 4.6, 4.8, 5, 6.

"3rd Generation Partnership Project; Technical Specification Group Network and Terminals; Mobile Management Entity (MME)—Visitor Location Register (VLR) SGs interface specification (Release 11)"; 3GPP Standard; 3GPP TS 29.118; 3rd Generation Partnership Project (3GPP); Mobile Competence Centre; 650, Route des Lucioles; F-06921 Sophia-Antipolis Cedex; France; vol. CT WG1, No. V11.5.0, Dec. 19, 2012, pp. 1-66, XP050691328, [retrieved on Dec. 19, 2012] sections 4, 5.2-5.6.

Nokie Siemens Networks: "LAU-less Emergency call with CSFB"; 3GPP Draft; S2-130341; 3rd Generation Partnership Project (3GPP); Mobile Competence Centre; 650, Route des Lucioles; F-06921 Sophia-Antipolis Cedex; France; Jan. 22, 2013; XP050684880, Retrieved from the Internet: URL:http://www.3gpp.org/ftp/tsg_sa/WG2_Arch/TSGS2_95_Prague/Docs/ [retrieved on Jan. 22, 2013] sections 1. Introduction, 2. Discussion.

* cited by examiner

CLEANUP OF LAU-LESS CIRCUIT SWITCHED FALLBACK EMERGENCY CALL

BACKGROUND

1. Field

Communication systems may benefit from various aspects of emergency call handing. For example, wireless communication systems may benefit from clean up with respect to a fast return feature applied to an emergency call using circuit switched fallback, without a location area update.

2. Description of the Related Art

Circuit switched fallback (CSFB) in the long term evolution (LTE) of third generation partnership project (3GPP) can permit a user equipment (UE) to reuse circuit switched (CS) domain for a voice call. This can include an emergency (E911) call. In release 10 (R10), a so-called "fast return" feature can be used to permit the user equipment to revert back immediately to LTE after the CS call is completed or the connection to the mobile switching center (MSC) is released.

For a mobile originated call using circuit switched fallback on a normal call, not an emergency call, the user equipment is conventionally required to first check the location area (LA) of the second or third generation (2/3G) cell that it has connected to. The user equipment then first performs a location area update (LAU), if this LA is different from the one that the user equipment has stored. This location area update procedure can ensure that the home location register (HLR) has the current serving node address, such as the address of the mobile switching center (MSC). This location area update can also update the LA that is stored inside the user equipment and is sent to a mobility management entity (MME) when the user equipment returns back to LTE. The MME can check this LA to determine whether an SGs interface needs to be re-established or not. The SGs interface can be the reference point between the MME and MSC server (MSS).

For an emergency call using CSFB, the user equipment can immediately proceed with a circuit switched (CS) call using an international mobile subscriber identity (IMSI) without first performing a location area update procedure even when the LA of the serving cell is different from the one that the user equipment has stored internally. In this case, even if the user equipment is not known in this MSC/visitor location register (VLR), based on configuration, MSC can still proceed with call setup toward a public safety answering point (PSAP). This is to ensure the E911 call setup is not delayed. After the CS emergency call is completed, the user equipment can perform a location area update procedure. If a fast return feature is used, the user equipment can immediately be redirected back to LTE without location area update.

Without location area update, the user equipment is unknown in the serving MSC/VLR. Thus, the home location register no longer has the current serving node information. This can result in an issue with a mobile terminating location request (MT-LR) procedure initiated by PSAP. However, this can be solved by having the serving MSC initiate the location area update procedure on behalf of the user equipment at the beginning of the call. Thus, one way of addressing a circuit switched call that happened as the result of circuit switched fallback is for a mobile switching center to perform a location area update on behalf of a user equipment. This approach can make the system's knowledge of the UE's serving node inconsistent. MME knows that UE is still registered in the previous MSC. UE knows that LA has not changed, and so there was no location area update form UE's perspective. Thus, when the emergency call is over and UE returns to LTE with fast return functionality, without executing a location update, the UE will not re-register to the previous MSC, and the UE becomes unreachable for any mobile terminated activity.

SUMMARY

According to a first embodiment, a method includes identifying an emergency communication that is a circuit switched fallback communication of a user equipment. The method also includes configuring communications so that mobile terminated services work properly after completion of the emergency communication.

In a variation of the first embodiment, a method can include determining in a network element that the emergency communication is a circuit switched fallback communication. The method can also include when the emergency call is ended, avoiding invoking a fast return feature for the user equipment.

In another variation of the first embodiment, a method can include determining that the emergency communication related to circuit switched fallback is complete. The method also includes performing a combined tracking area update with an international mobile subscriber identity attach indication based on the determining.

In a further variation of the first embodiment, a method includes determining that the emergency communication related to circuit switched fallback is complete. The method also includes retaining the user equipment in a circuit switched network for a predetermined amount of time upon the determining, wherein the predetermined amount of time is configured to permit a location area update to be performed for the user equipment before the predetermined amount of time has expired.

In an additional variation of the first embodiment, a method includes detecting, for an extended service request for a mobile originated circuit switched fallback by the user equipment, that the circuit switched fallback is due to an emergency. The method also includes marking an interface association for the user equipment as not valid.

According to a second embodiment, an apparatus includes at least one processor and at least one memory comprising computer program code. The at least one memory and the computer program code are configured to, with the at least one processor, cause the apparatus at least to identify an emergency communication that is a circuit switched fallback communication of a user equipment. The at least one memory and the computer program code are also configured to, with the at least one processor, cause the apparatus at least to configure communications so that mobile terminated services work properly after completion of the emergency communication.

According to a variation on the second embodiment, an apparatus includes at least one processor and at least one memory comprising computer program code. The at least one memory and the computer program code are configured to, with the at least one processor, cause the apparatus at least to determine in a network element that the emergency communication is a circuit switched fallback communication. The at least one memory and the computer program code are also configured to, with the at least one processor, cause the apparatus at least to, when the emergency call is ended, avoid invoking a fast return feature for the user equipment.

According to another variation on the second embodiment, an apparatus includes at least one processor and at least one memory comprising computer program code. The at least one memory and the computer program code are configured to, with the at least one processor, cause the apparatus at least to determine that the emergency communication related to circuit switched fallback is complete.

The at least one memory and the computer program code are also configured to, with the at least one processor, cause the apparatus at least to perform a combined tracking area update with an international mobile subscriber identity attach indication based on the determining.

According to a further variation on the second embodiment, an apparatus includes at least one processor and at least one memory comprising computer program code. The at least one memory and the computer program code are configured to, with the at least one processor, cause the apparatus at least to determine that the emergency communication related to circuit switched fallback is complete. The at least one memory and the computer program code are also configured to, with the at least one processor, cause the apparatus at least to retain the user equipment in a circuit switched network for a predetermined amount of time upon the determining, wherein the predetermined amount of time is configured to permit a location area update to be performed for the user equipment before the predetermined amount of time has expired.

According to an additional variation on the second embodiment, an apparatus includes at least one processor and at least one memory comprising computer program code. The at least one memory and the computer program code are configured to, with the at least one processor, cause the apparatus at least to detect, for an extended service request for a mobile originated circuit switched fallback by the user equipment, that the circuit switched fallback is due to an emergency. The at least one memory and the computer program code are also configured to, with the at least one processor, cause the apparatus at least to mark an interface association for the user equipment as not valid.

According to a third embodiment, an apparatus includes means for identifying an emergency communication that is a circuit switched fallback communication of a user equipment. The apparatus also includes means for configuring communications so that mobile terminated services work properly after completion of the emergency communication.

In a variation on the third embodiment, an apparatus includes means for determining in a network element that the emergency communication is a circuit switched fallback communication. The apparatus can also include means for, when the emergency call is ended, avoiding invoking a fast return feature for the user equipment.

In a variation on the third embodiment, an apparatus includes means for determining that the emergency communication related to circuit switched fallback is complete. The apparatus can also include means for performing a combined tracking area update with an international mobile subscriber identity attach indication based on the determining.

In a variation on the third embodiment, an apparatus includes means for determining that the emergency communication related to circuit switched fallback is complete. The apparatus can also include means for retaining the user equipment in a circuit switched network for a predetermined amount of time upon the determining, wherein the predetermined amount of time is configured to permit a location area update to be performed for the user equipment before the predetermined amount of time has expired.

In a variation on the third embodiment, an apparatus includes means for detecting, for an extended service request for a mobile originated circuit switched fallback by the user equipment, that the circuit switched fallback is due to an emergency. The apparatus can also include means for marking an interface association for the user equipment as not valid.

According to a fourth embodiment, a non-transitory computer-readable medium can be encoded with instructions that, when executed in hardware, perform a process that includes the method according to the first embodiment. In various respective variations, the process can include the process according to any of the variations of the first embodiment.

BRIEF DESCRIPTION OF THE DRAWINGS

For proper understanding of the invention, reference should be made to the accompanying drawings, wherein.

DETAILED DESCRIPTION

Figure 1:
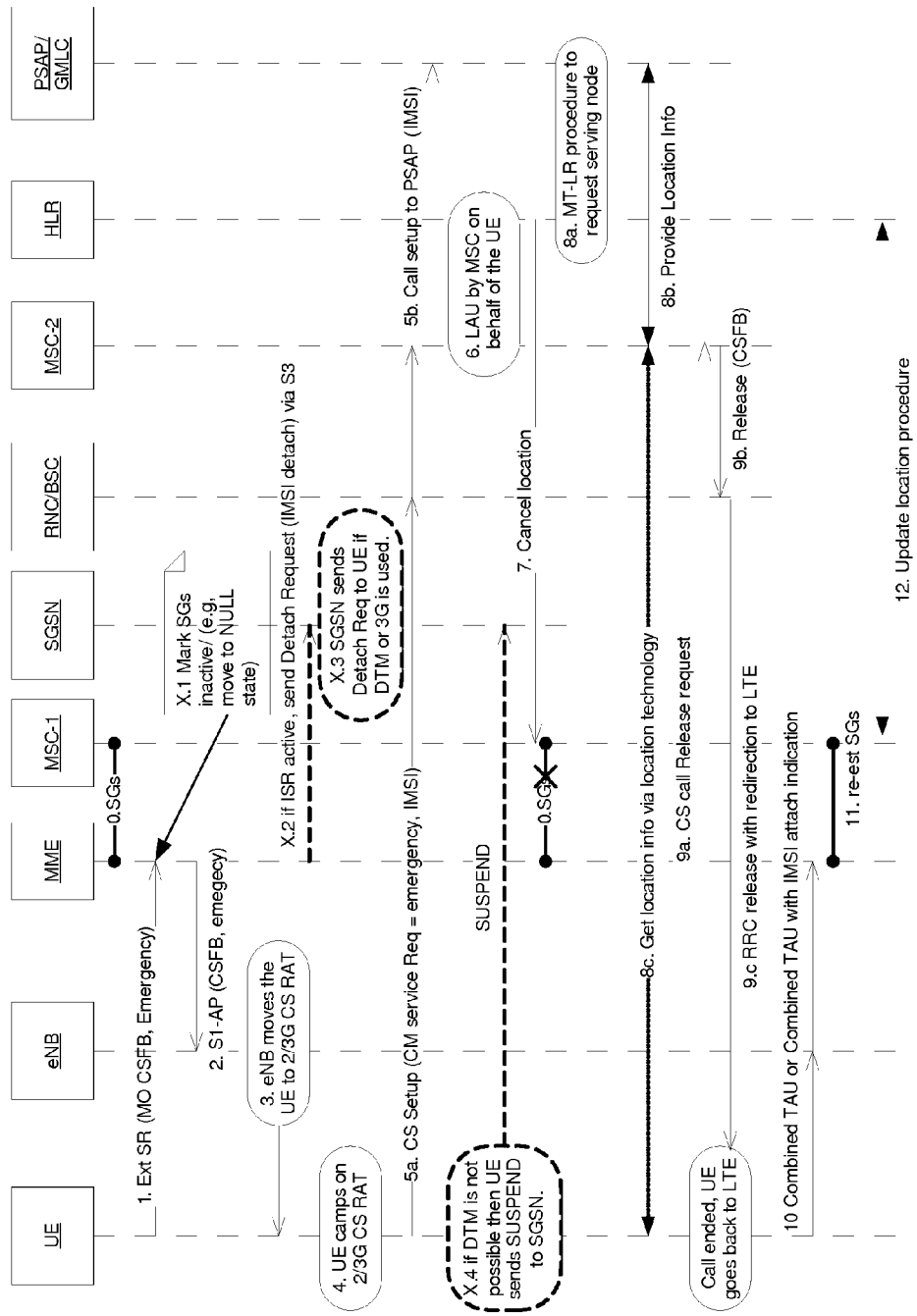
FIG. 1 illustrates an overall call flow according to certain embodiments.

When a mobile switching center (MSC) initiates a location area update without user equipment involvement, with a "fast return" feature the user equipment would not have done location area update in circuit switched (CS) domain, as it is redirected back to long term evolution (LTE) immediately. At this point, the user equipment may not perform combined tracking area update (TAU). Hence, there may conventionally be no way to re-establish the SGs association with the CS domain and also to update the home location register (HLR) with the correct MSC that has the SGs association. If the home location register is not updated with the correct serving MSC address, all mobile terminated (MT) related services will fail, including such MT services as MT call, MT-short message service (SMS), or MT-location request (LR). There is no conventional approach to addressing this scenario. However, certain embodiments can address this scenario and make the system's view consistent.

In summary, certain embodiments are related to emergency calling while CSFB is used. If the mobile switching center server (MSS) changes during the emergency call and there is no MSS-originated location updating toward the home location register, then all terminating SMS/call actions may fail because the subscriber is no longer using the last location updated network element. For correcting this MT routing functionality, the MSS could do the location update on behalf of the user equipment. This routing correction during the emergency call, however, still leaves open the issue that the calls/SMS are supposed to work after the emergency-call. Certain embodiments provide for such functionality.

With idle mode signaling reduction (ISR), the user equipment may not perform combined tracking area update if user equipment has not previously performed a combined routing area update (RAU), or separate LAU/RAU, and the user equipment can return to the LTE within the tracking area (TA) that is within the TA list that user equipment has stored. Without ISR, the user equipment may conventionally be required to do a combined tracking area update. However, the mobility management entity (MME) may not re-establish the SGs if the location area (LA) sent from user equipment has not changed and the update from user equipment is not performed explicitly with "IMSI attach".

Accordingly, certain embodiments provide at least four options. These options may be performed individually, or in any workable combination together. Additional steps or features not mentioned can also be performed in connection with each of these options.

According to a first option, an MSC that is serving the E911 call can refrain from indicating to the base station controller (BSC)/radio network controller (RNC) that this call is related to CSFB when the E911 call is ended. This can ensure that the fast return feature is not invoked. Other approaches of avoiding invocation of the fast return feature can similarly be used.

However, in this approach, the BSC and/or RNC may have propriety methods to move the user equipment immediately to LTE. While in this approach the user equipment may perform location area update after the radio resource (RR) connection is released, 3GPP technical specification (TS) 24.008 does not mandate the user equipment to perform location area update immediately after the CS call has ended; hence, user equipment behavior is not predictable. 3GPP TS 24.008, which is hereby incorporated herein by reference in its entirety, states: "If inter-system change is due to a mobile originating CS call, the location updating procedure can be performed after the RR connection is released unless the MS moves back to E-UTRAN."

According to a second option, the user equipment behavior can be mandated, such that if the user equipment did not perform a location area update in 2/3G for the emergency call and the user equipment returns to LTE after the call has ended; then the user equipment has to perform a combined tracking area update with an "IMSI attach" indication. Alternatively, the user equipment can be required to do a combined tracking area update with IMSI attach indication regardless of whether the user equipment has done a location area update or not when it returns to LTE. These approaches may not impact existing network entities, such as the RNC, BSC, MSC and MME. However, existing user equipment devices in the market already may need to be changed to adhere to the new requirements.

According to a third option, it can be mandated that the RNC and BSC must keep the user equipment in 2G/3G for some time after an emergency call due to CSFB. This may help to ensure the location area update is performed before the user equipment is redirected to LTE. This may require that the MSC signal to the BSC and RNC via Iu/A that the current call is an emergency call. This approach, accordingly, may impact the BSC, RNC, and MSC. An alternative approach is that BSC and RNC learns that the call is emergency call due to radio resource control (RRC) establishment cause=emergency. Thus, this approach does not need MSC to indicate emergency is A/Iu-cs signaling. However, this does not help the CSFB using packet switched handover (PS-HO). To address CSFB using PS-HO, the eNB can include "emergency call" in the transparent container to the target RAN when PS-HO procedure is used. This alternative may impact the evolved Node B (eNB), RNC, and BSC. It is not clear, in these alternatives, if and when the user equipment will perform location area update, since 3GPP TS 24.008 does not say that the user equipment has to do location area update immediately after the CS call has ended; hence, user equipment behavior is not predictable. 3GPP TS 24.008 is hereby incorporated herein by reference in its entirety.

According to a fourth option, when the user equipment initiates an extended service request for a mobile originated CS fallback emergency call, the MME can detect that this CSFB is due to emergency. Thus, the MME can mark the SGs association for this user equipment as not valid, for example move to a NULL state, and can continue the CSFB procedure. The user equipment is then served by the 2/3G network. If ISR is active, MME can initiate a DETACH REQUEST message with the detach type that indicates "IMSI detach" through the associated serving general packet radio service (GPRS) support node (SGSN) via S3. Depending on whether the user equipment is reachable or not, the SGSN can send the detach request towards the user equipment. This procedure can eventually reset the user equipment logic, as it deactivates ISR in the user equipment. In these cases, both ISR and non-ISR, the user equipment can be forced to do combined tracking area update when the user equipment comes back to LTE. As the SGs association is removed, the MME can then establish the SGs association with the MSC. This can impact the MME.

FIG. 1 illustrates an overall call flow according to certain embodiments. As shown in FIG. 1, at 0, an SGs can be associated between MME and MSC-1. The procedures at 1, 2, 3, 4, 5a, 5b can be performed as described in current 3GPP standards, to allow an emergency call to be invoked with CSFB. In this case, the user equipment can be camped on a cell that is served by a different MSC, namely MSC-2.

More particularly, at 1, the user equipment can send an extended service request, requesting set up of an emergency call. At 2, the MME can send a message to the eNB, which can lead the eNB to move the UE to 2G/3G CS radio access technology (RAT) at 3. At 4, the UE can camp on 2G/3G CS RAT. At 5a, CS setup can be requested of MSC-2, and at 5b, the MSC-2 can perform call setup.

In addition to the above, at X1 according to certain embodiments, the MME can mark the SGs association as invalid when detecting a CSFB for emergency call. This can be done by setting the SGs state to NULL.

Moreover, at X2, if ISR is active, the MME can send a detach request, which can include an IMSI detach indication, to an associated SGSN.

At X3, the SGSN will send the detach request to the user equipment if the user equipment is reachable, such as in a dual transfer mode (DTM) scenario. When the user equipment receives this message, it will reset its ISR status. I.e., when user equipment returns back to LTE, it will perform combined tracking area update with IMSI attach indication.

At X4, if user equipment is not reachable because it is in a non DTM environment, user equipment will then perform a suspend procedure. This is an existing procedure. When user equipment goes back to LTE, it will perform a combined tracking area update.

At 6, in order to allow MT-LR to work from this new MSC-2, the MSC-2 can perform a location area update on behalf of the user equipment. This location area update can trigger cancellation of location to the old MSC (MSC-1).

The procedures at 7, 8a, 8b, 8c, 9a, 9b, and 9c can all be performed according to any traditional approach desired. For example, at 7, the second home location register (HLR-2) can send a location cancellation to MSC-1. At 8a, the HLR and PSAP/gateway mobile location center (GMLC).

At 10, a user equipment can return to LTE and can perform a combined tracking area update because of X.3 or X.4.

At 11 and 12, because there is no SGs associated for this user equipment, the MME can establish the SGs with the MSC according to any desired way.

Thus, certain embodiments may allow the mobile terminated services to work properly after the completion of emergency call using CSFB. All or any of the options described above may ensure that the location area update and/or combined tracking area update is performed after the completion of emergency call using CSFB. Also, certain embodiments can ensure that the SGs association is established and the home location register is updated with the correct serving MSC address. The user equipment may still be expected to return to LTE as soon as the CS call is completed, and certain embodiments can ensure that the mobile terminated services will continue to work.

Figure 2:
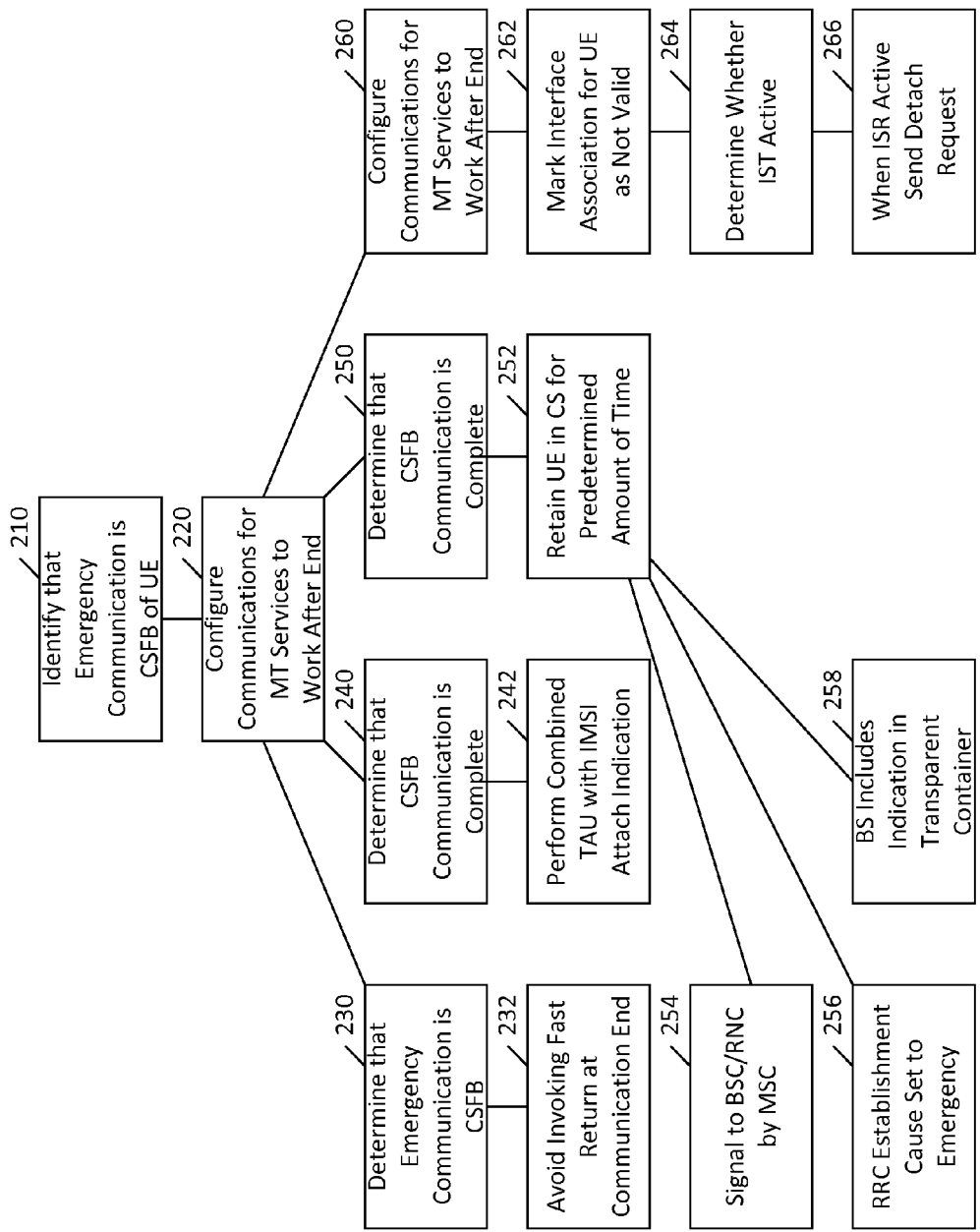
FIG. 2 illustrates methods according to various embodiments.

FIG. 2 illustrates methods according to various embodiments. As shown in FIG. 2, the methods can include, at 210, identifying an emergency communication that is a circuit switched fallback communication of a user equipment. The emergency communication may be, for example, a call, SMS, multimedia communication, or other communication on an emergency basis. The methods can also include, at 220, configuring communications so that mobile terminated services work properly after completion of the emergency communication. In certain embodiments, the identifying at 210 and the configuring at 220 are either optional or incorporated into other features, such as the features of the other methods illustrated in FIG. 2.

At 230, a method may include determining in a network element that the emergency communication is a circuit switched fallback communication. The method may also include, at 232, when the emergency call is ended, avoiding invoking a fast return feature for the user equipment. The avoiding invoking the fast return feature can include preventing a mobile switching center from indicating to at least one of a base station controller or radio network controller that the emergency communication is related to circuit switched fallback.

At 240, a method may include determining that the emergency communication related to circuit switched fallback is complete. The method may also include, at 242, performing a combined tracking area update with an international mobile subscriber identity attach indication based on the determining. The performing the combined tracking area update can, in certain embodiments, be done only when it is further determined that the user equipment did not perform a location area update in a second generation or third generation network for the emergency communication. Alternatively, in certain embodiments the performing the combined tracking area update can be done regardless of whether it is further determined that the user equipment did not perform a location area update in a second generation or third generation network for the emergency communication.

At 250, a method can include determining that the emergency communication related to circuit switched fallback is complete. The method can also include, at 252, retaining the user equipment in a circuit switched network for a predetermined amount of time upon the determining, wherein the predetermined amount of time is configured to permit a location area update to be performed for the user equipment before the predetermined amount of time has expired. The predetermined amount of time may be a predetermined fixed amount of time, or it can be a predetermined variable amount of time. The predetermined amount of time can be an indefinite period of time, such as until the user equipment begins a new communication session, such as a new call. Alternatively, the predetermined amount of time can be a number of seconds or fraction thereof.

The retaining can be based on a mobile switching center signaling, at 254, to a base station controller or radio network controller that a current communication is an emergency communication.

Alternatively, the retaining can be based on a base station controller or radio network controller learning, at 256, that a current communication is an emergency communication due to a radio resource control establishment cause set to emergency.

In another alternative, the retaining is based on a base station including, at 258, an indication that a communication is an emergency call in a transparent container to a target radio access network when a packet-switched handover procedure is used.

At 260, a method can include detecting, for an extended service request for a mobile originated circuit switched fallback by the user equipment, that the circuit switched fallback is due to an emergency. The method can also include, at 262, marking an interface association for the user equipment as not valid. The marking the interface association as not valid can include moving the interface association, for example an SGs association, to a null state.

The method can further include, at 264, determining whether an idle mode signaling reduction is active and, at 266, when the idle state signaling reduction is determined to be active, sending a detach request for the user equipment to a serving general purpose radio system support node. The detach request can be configured to trigger the serving general purpose radio system support node to send a detach request to the user equipment if the user equipment is using a third generation network or dual transfer mode. The SGSN may make a determination as to whether the user equipment is using a third generation network or dual transfer mode before sending the detach request to the user equipment.

Figure 3:
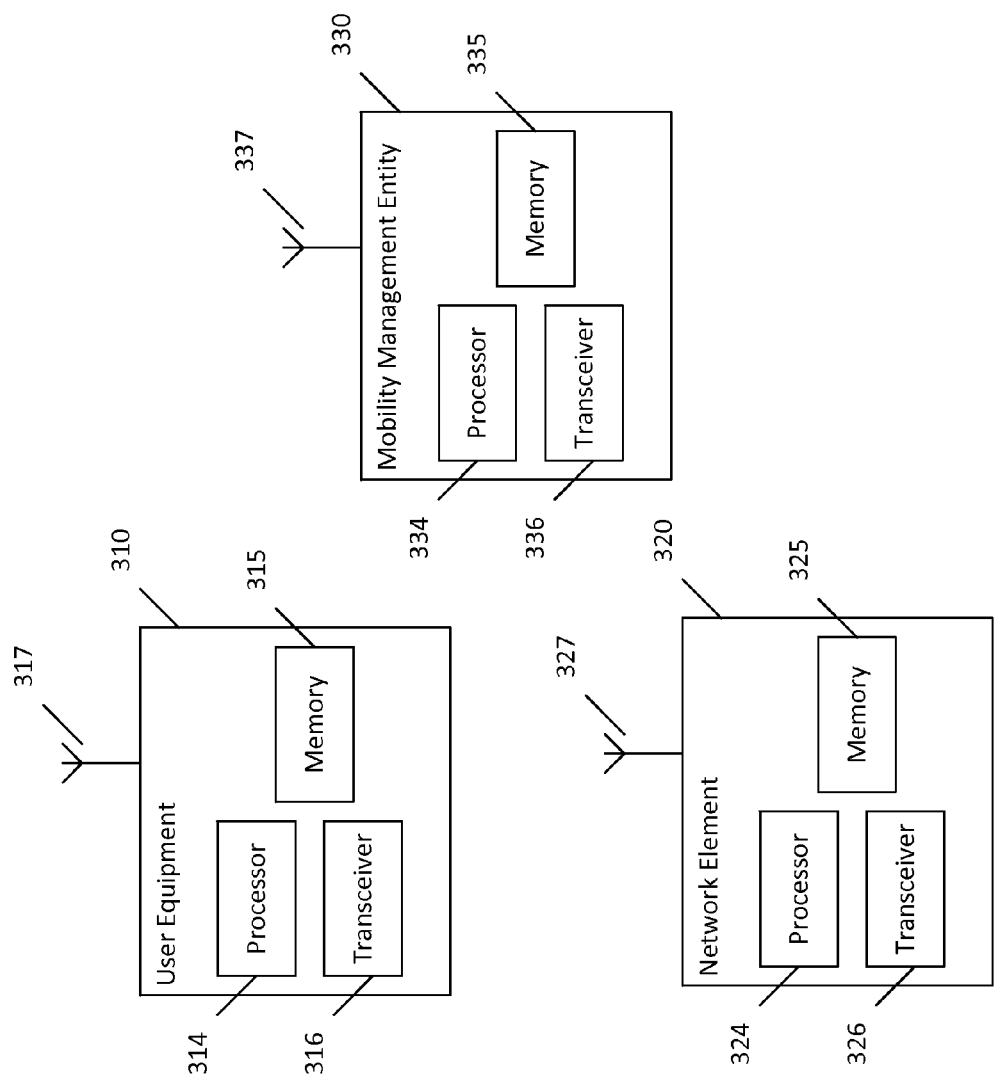
FIG. 3 illustrates a system according to certain embodiments.

FIG. 3 illustrates a system according to certain embodiments of the invention. In one embodiment, a system may include multiple devices, such as, for example, user equipment 310, network element 320, and mobility management entity 330. The network element can be any of the network elements illustrated or discussed herein, such as an eNB, MSC, SGSN, RNC, BSC, HLR, or PSAP/GMLC. Each of these devices may include at least one processor, respectively indicated as 314, 324, and 334. At least one memory is provided in each device, and indicated as 315, 325, and 335, respectively. The memory may include computer program instructions or computer code contained therein. Transceivers 316, 326, and 336 are provided, and each device may also include an antenna, respectively illustrated as 317, 327, and 337. Other configurations of these devices, for example, may be provided. For example, user equipment 310, network element 320, and mobility management entity 330 may be configured for wired communication, rather than wireless communication, and in such a case antennas 317, 327, and 337 would illustrate any form of communication hardware, without requiring a conventional antenna.

Transceivers 316, 326, and 336 can each, independently, be a transmitter, a receiver, or both a transmitter and a receiver, or a unit or device that is configured both for transmission and reception.

Processors 314, 324, and 334 can be embodied by any computational or data processing device, such as a central processing unit (CPU), application specific integrated circuit (ASIC), or comparable device. The processors can be implemented as a single controller, or a plurality of controllers or processors.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as user equipment 310, network element 320, and mobility management entity 330, to perform any of the processes described above (see, for example, FIGS. 1 and 2). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 3 illustrates a system including a user equipment, network element, and mobility management entity, embodiments of the invention may be applicable to other configurations, and configurations involving additional elements, as illustrated herein. As well, it is not strictly necessary that a mobility management entity be included. Moreover, although only one user equipment 310, network element 320, and mobility management entity 330 are shown, multiple of each of the devices in the system may be provided, as can be seen from, for example, FIG. 1.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    detecting, for an extended service request for a mobile originated circuit switched fallback by a user equipment, that the circuit switched fallback is due to an emergency; and
    marking an interface association for the user equipment as not valid based on it being detected that the circuit switched fallback is due to an emergency.

2. The method of claim 1, wherein the marking the interface association as not valid comprises moving the interface association to a null state.

3. The method of claim 1, wherein marking the interface comprises marking an SGs interface.

4. The method of claim 1, further comprising:
    determining whether an idle mode signaling reduction is active; and
    when the idle mode signaling reduction is determined to be active, sending a detach request for the user equipment to a serving general purpose radio system support node.

5. The method of claim 4, wherein the detach request is configured to trigger the serving general purpose radio system support node to send a detach request to the user equipment if the user equipment is using a third generation network or dual transfer mode.

6. An apparatus, comprising:
    at least one processor; and
    at least one memory comprising computer program code, wherein the at least one memory and the computer program code are configured to, with the at least one processor, cause the apparatus at least to
    detect, for an extended service request for a mobile originated circuit switched fallback by the user equipment, that the circuit switched fallback is due to an emergency; and
    mark an interface association for the user equipment as not valid based on it being detected that the circuit switched fallback is due to an emergency.

7. The apparatus of claim 6, wherein the at least one memory and the computer program code are configured to, with the at least one processor, cause the apparatus at least to mark the interface association as not valid by moving the interface association to a null state.

8. The apparatus of claim 6, wherein the at least one memory and the computer program code are configured to, with the at least one processor, cause the apparatus at least to mark the interface by marking an SGs interface.

9. The apparatus of claim 6, wherein the at least one memory and the computer program code are further configured to, with the at least one processor, cause the apparatus at least to
    determine whether an idle mode signaling reduction is active; and
    when the idle mode signaling reduction is determined to be active, send a detach request for the user equipment to a serving general purpose radio system support node.

10. The apparatus of claim 9, wherein the detach request is configured to trigger the serving general purpose radio system support node to send a detach request to the user equipment if the user equipment is using a third generation network or dual transfer mode.

11. An apparatus, comprising:
    means for detecting, for an extended service request for a mobile originated circuit switched fallback by a user equipment, that the circuit switched fallback is due to an emergency; and
    means for marking an interface association for the user equipment as not valid based on it being detected that the circuit switched fallback is due to an emergency.

12. The apparatus of claim 11, wherein the marking the interface association as not valid comprises moving the interface association to a null state.

13. The apparatus of claim 11, wherein marking the interface comprises marking an SGs interface.

14. The apparatus of claim 11, further comprising:
    means for determining whether an idle mode signaling reduction is active; and
    means for, when the idle mode signaling reduction is determined to be active, sending a detach request for the user equipment to a serving general purpose radio system support node.

15. The apparatus of claim 14, wherein the detach request is configured to trigger the serving general purpose radio system support node to send a detach request to the user equipment if the user equipment is using a third generation network or dual transfer mode.

16. A non-transitory computer-readable medium encoded with instructions that, when executed in hardware, perform a process, the process comprising:
    detecting, for an extended service request for a mobile originated circuit switched fallback by a user equipment, that the circuit switched fallback is due to an emergency; and
    marking an interface association for the user equipment as not valid based on it being detected that the circuit switched fallback is due to an emergency.

17. The non-transitory computer-readable medium of claim 16, wherein the marking the interface association as not valid comprises moving the interface association to a null state.

18. The non-transitory computer-readable medium of claim 16, wherein marking the interface comprises marking an SGs interface.

19. The non-transitory computer-readable medium of claim 16, the process further comprising:
   determining whether an idle mode signaling reduction is active; and
   when the idle mode signaling reduction is determined to be active, sending a detach request for the user equipment to a serving general purpose radio system support node.

20. The non-transitory computer-readable medium of claim 19, wherein the detach request is configured to trigger the serving general purpose radio system support node to send a detach request to the user equipment if the user equipment is using a third generation network or dual transfer mode.

* * * * *